Feb. 8, 1966 R. D. BECK 3,233,629
PROGRAMMER VALVE
Filed Sept. 7, 1962 2 Sheets-Sheet 1
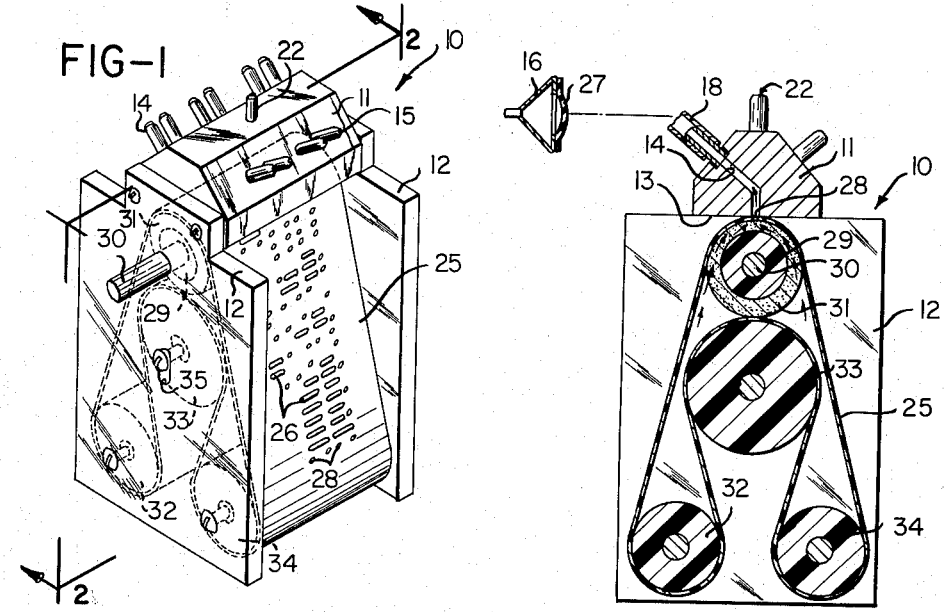
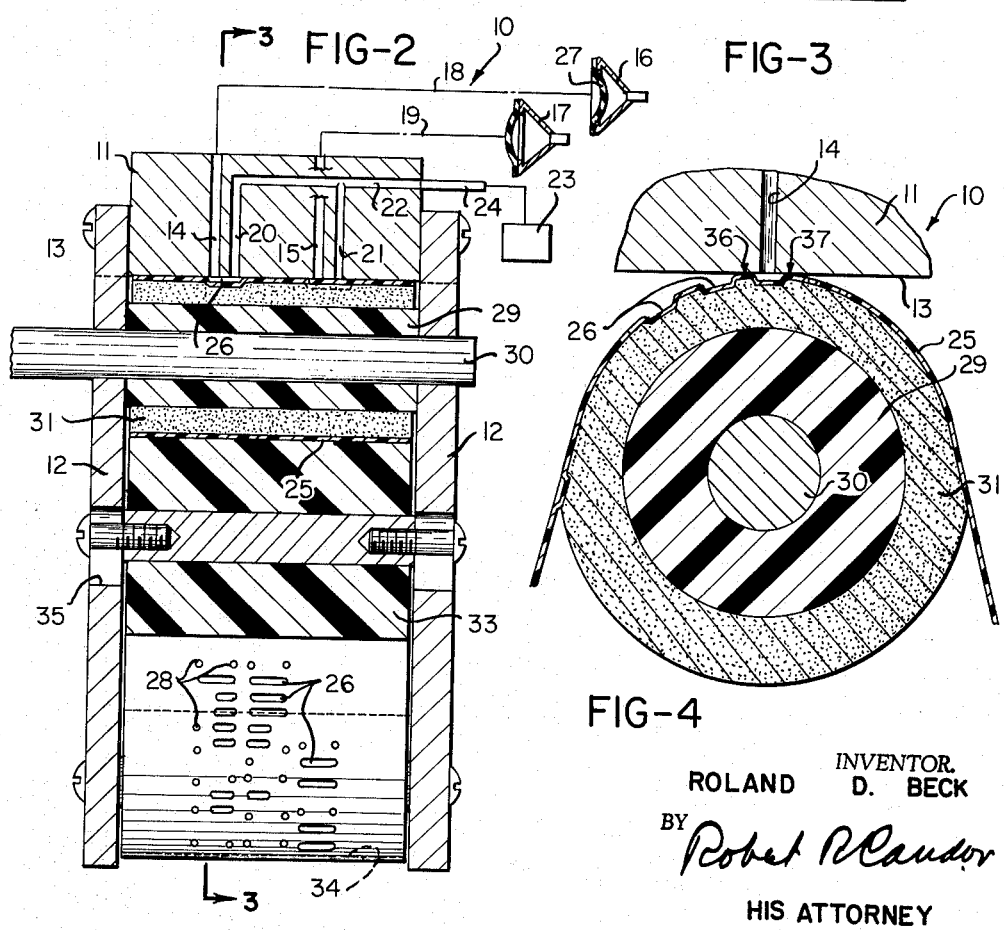
INVENTOR.
ROLAND D. BECK
BY
HIS ATTORNEY Feb. 8, 1966  R. D. BECK  3,233,629
PROGRAMMER VALVE
Filed Sept. 7, 1962  2 Sheets-Sheet 2

INVENTOR.
ROLAND D. BECK
BY
HIS ATTORNEY

United States Patent Office 3,233,629
Patented Feb. 8, 1966

3,233,629
PROGRAMMER VALVE
Roland D. Beck, Anaheim, Calif., assignor to Robertshaw Controls Company, Richmond, Va., a corporation of Delaware
Filed Sept. 7, 1962, Ser. No. 222,008
29 Claims. (Cl. 137—624.18)

This invention relates to an improved valving mechanism, such as a valving mechanism for controlling a vacuum program system.

It is well known that a series of vacuum operated devices can be controlled by selectively imposing a vacuum thereon in the desired timed sequence and for the desired lengths of time by moving a reading sheet relative to a reading surface.

In particular, a reading head is provided with a reading surface interrupted by a plurality of aligned passages or the like, certain of the passages being interconnected to the vacuum operated devices and the other passages being interconnected to a vacuum source or the like.

The reading sheet has a plurality of inverted channels provided therein which, when passed over the reading surface, are each adapted to interconnect a vacuum source passage with a vacuum operated device passage at the reading surface to effectively interconnect the vacuum source to the vacuum operated device.

In this manner, the reading sheet can have the channels so arranged thereon that as the reading sheet is moved past the reading surface in the desired time sequence, the various vacuum operated devices will be selectively actuated in the proper timed sequence and for the desired lengths of time.

Such a vacuum program control system is particularly useful for controlling an automatic washing machine or the like.

For example, see the copending patent application S.N. 148,322 filed October 30, 1961 and entitled, Apparatus and Method of Sequential Control wherein a complete vacuum program system for a washing machine or the like is disclosed and claimed.

The valving mechanism of this invention is particularly adaptable for such a washing machine program control.

In particular, this invention provides improved means for driving a reading sheet relative to a reading surface of a reading head or the like.

In one embodiment of this invention, the driving means not only drives the reading sheet relative to the reading surface, but also assists in sealing the reading sheet against the reading surface and filters the air entering the reading head.

Accordingly, it is an object of this invention to provide an improved valving mechanism having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a perspective view of the improved valving mechanism of this invention.

FIGURE 2 is an enlarged cross-sectional view of the valving mechanism of FIGURE 1 and is taken on line 2—2 thereof.

FIGURE 3 is a reduced cross-sectional view taken on line 3—3 of FIGURE 2 with the reading sheet moved to a different position thereof.

FIGURE 4 is an enlarged fragmentary view similar to FIGURE 3 illustrating the reading sheet in another operating position thereof.

Figure 5:
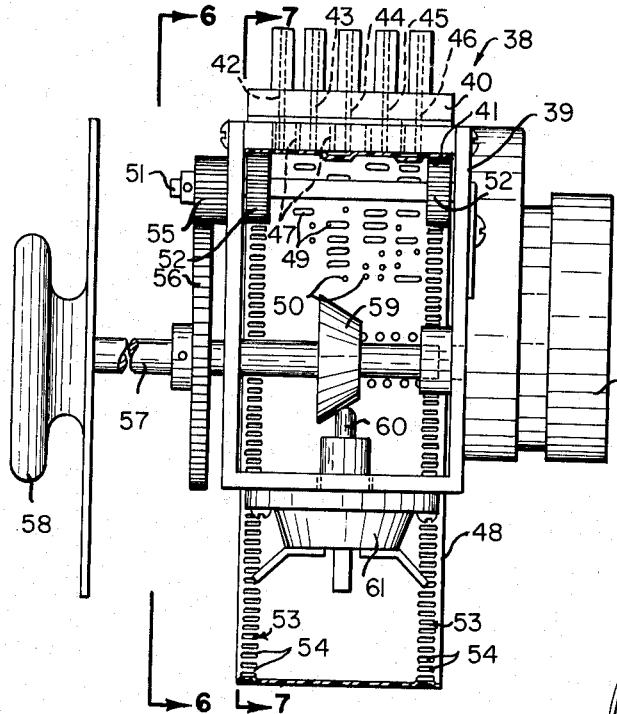
FIGURE 5 is a broken-away view of another valving mechanism of this invention.

While the various features of this invention are hereinafter described as being particularly adaptable for controlling a vacuum program system, it is to be understood that the various features of this invention can be utilized singly or in any combination thereof to provide other control systems as desired.

Therefore, this invention is not to be limited to only the embodiments illustrated in the drawings, because the drawings are merely utilized to illustrate one of the wide variety of uses for this invention.

Referring now to FIGURES 1–4, the improved valving mechanism of this invention is generally indicated by the reference numeral 10 and comprises a reading head or block 11 secured between a pair of like frame members 12 and having a substantially flat reading surface 13 interrupted by a plurality of passages 14 and 15 respectively leading to vacuum operated devices 16 and 17 by conduit means 18 and 19, the reading surface 13 also being interrupted by a plurality of passages 20 and 21 disposed in aligned, spaced relation with the passages 14 and 15 and being interconnected to a common manifold 22 leading to a vacuum source 23 by a conduit means 24.

While only two vacuum operated devices 16 and 17 are illustrated in the drawings, it is to be understood that the reading surface 13 of the reading head 11 could be uninterrupted by any desired number of pairs of passages 14, 20 and 15, 21 as desired, the important feature being to have one vacuum operated device passage disposed closely adjacent one vacuum source passage as will be apparent hereinafter.

A substantially flexible reading sheet or tape 25 is provided for the valving mechanism 10 and has a plurality of indentations or inverted channels 26 provided therein which are each adapted to interconnect a vacuum source passage of the reading head 11 with a vacuum operated device passage when the respective indentation 26 is disposed against the reading surface 13 at the passage means thereof as illustrated by the left-hand indentation 26 in FIGURE 2.

When the indentation 26 of the reading sheet 25 brides the gap between the passages 14 and 20 of the reading head 11 in the manner illustrated in FIGURE 2, it can be seen that the vacuum source 23 is interconnected to the vacuum operated device 16 whereby the flexible diaphragm 27 of the vacuum operated device 16 is moved in a particular direction to actuate any suitable structure, such as switches, valves and the like.

Even though the reading sheet 25 is continuously moving relative to the reading surface 13 of the reading head 11 in a manner hereinafter described, the vacuum source 23 can be continuously interconnected to the vacuum operated device 16 for a desired length of time by so spacing the indentations 26 in each row thereof that the space between each adjacent pair of indentations 26 is smaller than the port size of the passages 14 and 20 whereby a continuous operation of the vacuum operated device 16 will be affected as long as the indentations 26 are brought into alignment with the passages 20 and 14.

However, if it is desired to terminate the operation of the vacuum operated device 16, a suitable aperture 28 passing completely through the reading sheet 25 comes into alignment with the passage 14 whereby air is adapted to enter the passage 14 through the respective aperture 28 to permit the diaphragm 27 of the vacuum operated device 16 to move in the opposite direction as illustrated in FIGURE 3 to terminate the operation thereof, the diaphragm 27 moving to the position illustrated in FIGURE 3 by spring pressure, atmospheric condition, or both as desired.

Therefore, it can be seen that it is relatively simple to control the operation of a plurality of vacuum operated devices by providing the desired controlling pattern in a reading sheet and moving that reading sheet relative to the reading surface of a reading head at a desired speed.

This invention provides improved means for moving the reading sheet 25 relative to the reading surface 13 of the reading head 11.

In particular, a substantially cylindrical, rigid backing member 29 is mounted on a shaft 30 passing between the frame members 12 whereby the backing member 29 is adapted to be rotated on an axis disposed substantially parallel to the reading surface 13 of the reading head 11 when the shaft 30 is rotated in any desired manner, such as by an electrical timer motor or the like.

A substantially cylindrical sleeve 31 of porous and compressible material, such as foamed plastic or the like, is secured around the rigid backing member 29 and is of such a size that the same is compressed against the reading surface 13 of the reading head 11 for a purpose hereinafter described.

A plurality of rollers 32, 33 and 34 are rotatably mounted between the frame members 12 to permit the reading sheet 25, which is a continuous band or the like to pass around the same as well as the sleeve 31 in the manner illustrated in FIGURE 3 whereby the reading sheet 25 is disposed between the sleeve 31 and the reading surface 13 of the reading head 11.

The roller 33 is mounted for adjustment relative to the frame members 12 by the slot means 35 to permit easy assemblying of the reading sheet 25 about the various rollers.

In this manner, a relatively long reading sheet 25 can be provided while the tortuous path thereof provided by the rollers permits the reading sheet to be contained in a relatively small and compact space between the frame members 12.

Since the resilient material 31 is placed under compression between the reading sheet 25 and the non-yielding sleeve 29, the compressed portion of the material 31 tends to urge the reading sheet 25 into sealing relation with the reading surface 13 for the purpose now to be described.

As illustrated in FIGURE 4, the compressed material 31 tends to urge the reading sheet 25 into sealing relation with the reading surface 13 of the reading head 11 on each side of a particular indentation 26 being aligned with the passage means in the reading head 11 at the points 36 and 37 to prevent air from entering the passage 14 so that a true vacuum condition can be created therein by the bridging indentation 26.

Because a vacuum condition is being created in the particular indentation 26 by the vacuum passage 20, the vacuum also tends to hold the reading sheet 25 into sealing relation with the reading surface 13 of the reading head 11.

However, it has been found that because of the arcuate path being traveled by the reading sheet 25 relative to the reading surface 13 of the reading head 11, it is necessary to augment the sealing effect of the vacuum source by the compressible means 31 to tend to flatten the sheet 25 out at the passage means in the reading head 11.

Not only does the compressed material 31 provide for the sealing effect of the reading sheet 25 against the reading surface 13 of the reading head 11, but the same also, through friction, drives the reading sheet 25 to move in unison therewith as the shaft 30 is driven in the desired direction whereby the resilient material 31 not only drives the reading sheet 25 relative to the reading surface 13 of the reading head 11, but also assists in sealing the reading sheet 25 against the reading surface 13 of the reading head 11 at the nip of the reading surface 13 and sleeve 31.

When a particular aperture 28 in the reading sheet 25 comes into alignment with a respective vacuum operated device passage, such as passage 14, as illustrated in FIGURE 3, air is adapted to pass through the porous material 31, aperture 28 and into the passage means 14 leading to the vacuum operated device 16 to de-activate the same.

Since the air entering the passage means 14 must pass through the porous material 31 as indicated by the arrows in FIGURE 3, it can be seen that the material 31 effectively filters the air before the same reaches the passage means 14 so that no dust particles or the like will clog the various passages controlled by the reading sheet 25 of this invention.

Therefore, it can be seen that the improved driving means of the value mechanism 10 of this invention is not only adapted to drive the reading sheet 25 at the desired speed, but the same also assists in sealing the reading sheet 25 to the reading surface 13 of the reading head 11 and filters the air entering the vacuum operated device passages.

Figure 6:
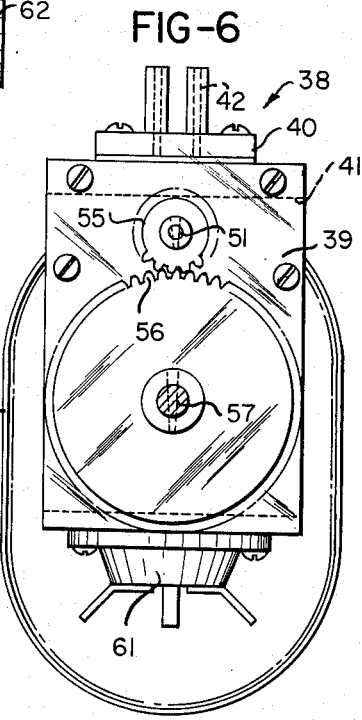
FIGURE 6 is a cross-sectional view taken on line 6—6 of FIGURE 5.
Figure 7:
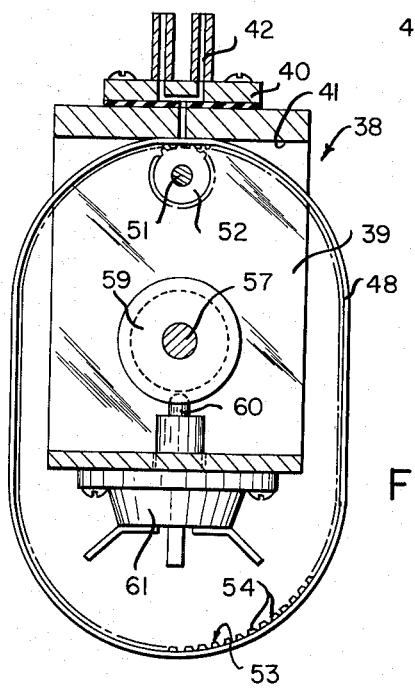
FIGURE 7 is a cross-sectional view taken on line 7—7 of FIGURE 5.

Another valving mechanism of this invention is generally indicated by the reference numeral 38 in FIGURES 5-7 and comprises a frame structure 39 carrying a reading head or block 40 having a reading surface 41 interrupted by a plurality of vacuum operated device passages 42, 43, 44, 45 and 46 and a plurality of vacuum source passages 47, each vacuum source passage 47 being located in spaced alignment with a respective passage 42-46 for the reason previously described.

A continuous reading sheet or tape 48 is adapted to move over the reading surface 41 to provide the program control in the manner previously described as the reading sheet 45 has a plurality of indentations 49 and apertures 50 formed therein for the purpose previously described.

A shaft 51 is rotatably carried by the frame means 39 and is adapted to rotate on an axis substantially parallel to the reading surface 41 of the reading head 40, the shaft 51 carrying a pair of substantially circular gears 52 adapted to respectively mesh with gear means 53 formed on the side edges of the tape or flexible sheet 48, the gear means 53 comprising a plurality of aligned projections 54 formed in substantially the same manner as the indentations 49 previously described.

The gears 52 of the shaft 51 are so constructed and arranged that the same are not only adapted to mesh with the gear means 53 of the tape 48 but are also adapted to hold the tape 48 against the reading surface 41 of the reading head 40 to assist in the sealing of the reading seat 48 against the reading surface 41 as well as to drive the reading sheet 48 relative to the reading surface 41 upon rotation of the shaft 51 in any desired manner.

For example, the shaft 51 can carry a gear 55 adapted to be disposed in meshing relation with a gear 56 on a control shaft 57 adapted to be axially moved relative to the frame means 39 by a control knob 58.

The shaft 57 carries a substantially frusto-conical cam 59 which, when moved to the right upon movement of the control knob 58 to the right, actuates a plunger 60 of a suitable switch 61 which causes a timer motor 62, carried by the frame means 39, to rotate the shaft 57 in the proper direction to cause movement of the reading sheet 48 relative to the reading surface 41 of the reading head 40.

When it is desired to stop movement of the reading sheet 48 relative to the reading surface 41 of the reading head 40, the control knob 58 is pulled to the left whereby the cam means 59 is likewise moved to the left and permits the plunger 60 to terminate the electrical current to the timer motor 62.

Therefore, it can be seen that the valving mechanism 38 of this invention has improved driving means for moving the reading sheet 48 relative to the reading surface 41 of the reading head 40.

However, it is to be understood that instead of having a positive connection between the drive means and the tape 48 as provided by the gears 52 and the gear means 53 of the tape 48, it is to be understood that the gear means 52 could comprise resilient members which merely frictionally drive the tape 38 relative to the reading surface 41 of the reading head 50 if desired.

Accordingly, it can be seen that this invention provides improved means for moving a reading sheet relative to the reading surface of a reading head to provide for the proper sequence of control of desired devices.

While the form of the invention now preferred has been disclosed as required by the statutes, other forms may be used, all coming within the scope of the claims which follow.

What is claimed is:

1. In combination, a stationary reading head having a reading surface interrupted by passage means, a driving means movable opposite to said passage means of said reading surface, and a reading sheet disposed between said reading surface and said driving means to be moved relative to said reading surface by said driving means and having means to interconnect selected passage means together, said sheet being movable relative to both said reading head and said driving means, said driving means, reading head and sheet being so constructed and arranged that said sheet has portions thereof successively coming into simultaneous contact with said reading surface and said driving means as said sheet is moved relative to said reading surface.

2. A combination as set forth in claim 1 wherein said driving means assists in sealing said sheet to said reading surface at said passage means.

3. A combination as set forth in claim 1 wherein said driving means has a compressible periphery compressed against said sheet to assist in sealing said sheet to said reading surface at said passage means.

4. A combination as set forth in claim 1 wherein said sheet has an aperture passing therethrough, to be aligned with one of said passage means to let air enter the same and wherein said driving means has filtering means to filter air entering said one passage means through said aperture.

5. A combination as set forth in claim 1 wherein said driving means includes gear means disposed in meshing relation with gear means on said sheet.

6. In combination, a stationary reading head having a reading surface interrupted by passage means, a driving means having driving surface means orbiting about an axis disposed substantially parallel to said reading surface and opposite to said passage means, and a reading sheet disposed between said reading surface and said driving surface means to be moved relative to said reading surface by said driving surface and having means to interconnect selected passage means together, said sheet being movable relative to both said reading head and said driving means, said driving means, reading head and sheet being so constructed and arranged that said sheet has portions thereof successively coming into simultaneous contact with said reading surface and said driving surface means as said sheet is moved relative to said reading surface.

7. A combination as set forth in claim 6 wherein said driving surface means assists in sealing said sheet to said reading surface at said passage means.

8. A combination as set forth in claim 6 wherein said driving surface means is compressible and is compressed against said sheet to assist in sealing said sheet to said reading surface at said passage means.

9. A combination as set forth in claim 6 wherein said sheet has an aperture passing therethrough to be aligned with one of said passage means to let air enter the same and wherein said driving surface means has filtering means to filter air entering said one passage means through said aperture.

10. A combination as set forth in claim 6 wherein said driving surface means includes gear means disposed in meshing relation with gear means on said sheet.

11. In combination, a stationary reading head having a reading surface interrupted by passage means, a rotatable driving member mounted adjacent said reading surface for movement about an axis disposed parallel to said reading surface and opposite to said passage means, and a reading sheet disposed between said reading surface and said driving member to be moved relative to said reading surface by said driving member and having means to interconnect selected passage means together, said sheet being movable relative to both said reading head and said driving member, said driving member, reading head and sheet being so constructed and arranged that said sheet has portions thereof successively coming into simultaneous contact with said reading surface and said driving member as said sheet is moved relative to said reading surface.

12. A combination as set forth in claim 11 wherein said driving member assists in sealing said sheet to said reading surface at said passage means.

13. A combination as set forth in claim 11 wherein said driving member has a compressible periphery compressed against said sheet to assist in sealing said sheet to said reading surface at said passage means.

14. A combination as set forth in claim 11 wherein said sheet has an aperture passing therethrough to be aligned with one of said passage means to let air enter the same and wherein said driving member has filtering means to filter air entering said one passage means through said aperture.

15. A combination as set forth in claim 11 wherein said driving member includes gear means disposed in meshing relation with gear means on said sheet.

16. In combination, a stationary reading head having a flat reading surface interrupted by passage means, a rotatable driving member mounted opposite to said passage means of said reading surface for movement about an axis disposed parallel to said reading surface, said driving member having a substantially circular cross sectional configuration whereby said reading surface is substantially tangential to the periphery of said driving member, and a reading sheet disposed between said reading surface and said driving member to be moved relative to said reading surface by said driving member and having means to interconnect selected passage means together, said sheet being movable relative to both said reading head and said driving member, said driving member, reading head and sheet being so constructed and arranged that said reading sheet has portions thereof successively coming into simultaneous contact with said reading surface and said driving member as said sheet is moved relative to said reading surface.

17. A combination as set forth in claim 16 wherein said driving member assists in sealing said sheet to said reading surface at said passage means.

18. A combination as set forth in claim 16 wherein said driving member has a compressible periphery compressed against said sheet to assist in sealing said sheet to said reading surface at said passage means.

19. A combination as set forth in claim 16 wherein said sheet has an aperture passing therethrough to be aligned with one of said passage means to let air enter the same and wherein said driving member has filtering means to filter air entering said one passage means through said aperture.

20. A combination as set forth in claim 16 wherein said driving member includes gear means disposed in meshing relation with gear means on said sheet.

21. In combination, a stationary reading head having a flat reading surface interrupted by passage means, a substantially cylindrical driving member mounted for rotation adjacent said reading surface about an axis disposed substantially parallel to said reading surface and opposite to said passage means, and a reading sheet disposed between said reading surface and said driving member to be moved relative to said reading surface by said driving member and having means to interconnect selected passages, said sheet being movable relative to both said reading head and said driving member, said driving member, reading head and sheet being so constructed and arranged that said sheet has portions successively coming into simultaneous contact with said reading surface and said driving member as said sheet is moved relative to said reading surface.

22. A combination as set forth in claim 21 wherein said driving member has a compressible periphery compressed against said sheet to assist in sealing said sheet to said reading surface at said passage means.

23. A combination as set forth in claim 21 wherein said sheet has an aperture passing therethrough to be aligned with one of said passage means to let air enter the same and wherein said driving member has a filtering periphery to filter air entering said one passage means through said aperture.

24. A combination as set forth in claim 21 wherein said sheet is continuous.

25. A combination as set forth in claim 21 wherein said sheet is continuous and passes around a plurality of rollers to move through a tortuous path.

26. A combination as set forth in claim 21 wherein said sheet has a plurality of indentations formed therein whereby each indentation is adapted to bridge the gap between selected passage means to interconnect the same together.

27. In combination, a reading head having a flat reading surface interrupted by passage means, gear means mounted for rotation adjacent said reading surface about an axis disposed substantially parallel to said reading surface and opposite to said passage means, and a reading sheet disposed between said reading surface and said gear means and having means to interconnect selected passage means together, said reading sheet having gear means disposed in meshing relation with said first-named gear means to cause said sheet to move relative to said reading surface upon rotational movement of said first-named gear means whereby said sheet interconnects selected passage means together.

28. A combination as set forth in claim 27 wherein said first-named gear means includes a shaft having two gears mounted in spaced relation thereon and wherein said gear means of said sheet includes two rows of projection means respectively disposed along the side edges thereof and in meshing relation with said gears.

29. A combination as set forth in claim 27 wherein said sheet is continuous.

References Cited by the Examiner

UNITED STATES PATENTS

| | | | |
|---|---|---|---|
| 1,633,487 | 6/1927 | Maerten. | |
| 2,453,239 | 11/1948 | Luhn | 235—61.117 X |
| 2,530,622 | 11/1950 | Maris | 137—624.15 X |
| 2,678,063 | 5/1954 | Ellis | 137—624.2 X |
| 2,824,182 | 2/1958 | Lambert | 235—61.117 |

M. CARY NELSON, *Primary Examiner.*

ISADOR WEIL, WILLIAM F. O'DEA, *Examiners.*